United States Patent [19]

Maeda et al.

[11] Patent Number: 5,665,241
[45] Date of Patent: *Sep. 9, 1997

[54] DEPHOSPHORIZING MATERIAL AND DEPHOSPHORIZING METHOD

[75] Inventors: Terunobu Maeda, Ibaraki-ken; Atsunori Negishi, Tsukuba, both of Japan

[73] Assignee: Hazama Corporation, Tokyo, Japan

[*] Notice: The term of this patent shall not extend beyond the expiration date of Pat. No. 5,518,631.

[21] Appl. No.: 557,064

[22] PCT Filed: Mar. 16, 1995

[86] PCT No.: PCT/JP95/00449

§ 371 Date: Nov. 13, 1995

§ 102(e) Date: Nov. 13, 1995

[87] PCT Pub. No.: WO95/25586

PCT Pub. Date: Sep. 28, 1995

[30] Foreign Application Priority Data

Mar. 18, 1994 [JP] Japan ................. 6-048993

[51] Int. Cl.$^6$ ........................................... C02F 1/52
[52] U.S. Cl. .................. 210/683; 210/702; 210/906; 502/406; 423/140
[58] Field of Search ............... 210/702, 906, 210/683, 715, 709; 264/50–54, 311, 69; 502/406; 423/140, 311

[56] References Cited

U.S. PATENT DOCUMENTS

| | | |
|---|---|---|
| 2,635,991 | 4/1953 | Briggs ........................ 210/379 |
| 3,499,837 | 3/1970 | Jaunarajs ..................... 210/906 |
| 3,984,313 | 10/1976 | Higgins ....................... 210/906 |
| 4,080,290 | 3/1978 | Klantschi et al. ............ 210/692 |
| 4,081,365 | 3/1978 | White et al. ................. 210/906 |
| 4,184,947 | 1/1980 | Demisch ...................... 210/617 |
| 4,389,317 | 6/1983 | Trentelman et al. .......... 210/715 |
| 4,507,207 | 3/1985 | Verhoeve et al. ............. 210/709 |
| 5,008,224 | 4/1991 | Watanabe et al. ............. 210/906 |
| 5,124,044 | 6/1992 | Cassidy et al. .............. 210/683 |
| 5,518,631 | 5/1996 | Maeda ......................... 210/906 |

*Primary Examiner*—Cynthia L. Nessler
*Attorney, Agent, or Firm*—Darby & Darby

[57] ABSTRACT

A dephosphorizing material containing iron and/or an iron-containing compound, a cementitious material, water, and a mixing agent for accelerating bleeding as the starting material, and having fine pores therein formed by solidifying the starting materials while bleeding not less than 2.0% by weight of the water contained in the starting materials to render the percent water absorption of not less than 10%; and a dephosphorizing method which includes bringing the dephosphorizing material into contact with a phosphorus-containing aqueous solution. This dephosphorizing material can effectively reduce the phosphorus concentration in sewages, rivers, or the like by fixing the phosphorus component on its surface. The dephosphorizing method is so simple that it can be effected merely by bringing the dephosphorizing material into contact with a phosphorus-containing aqueous solution, thus being capable of removing the phosphorus component effectively without necessity for any special controls.

10 Claims, 2 Drawing Sheets

DAYS ELAPSED

DAYS ELAPSED

DEPHOSPHORIZING MATERIAL AND DEPHOSPHORIZING METHOD

FIELD OF ART

The present invention relates to a dephosphorizing material capable of effectively removing phosphorus component from a phosphorus-containing aqueous solution in sewerages, rivers, or the like, and to an easy and convenient dephosphorizing method utilizing such dephosphorizing material.

BACKGROUND ART

Various discussions have hitherto been made as to a dephosphorizing process in sewerages, rivers, or the like, and pilot experiments have been conducted in various regions of the country. For example, a contact dephosphorizing method is known, wherein a phosphorus-containing aqueous solution is controlled under appropriate conditions, and contacted with a compound of the same species and same system consisting of calcium phosphate, thereby forming and crystallizing calcium phosphate (hydroxy apatite) on the above compound.

According to the above contact dephosphorizing method, the concentration of the phosphorus component contained in water can be lowered effectively. However, pH of the phosphorus-containing water should be adjusted by a decarboxylating process or addition of lime in order to control such crystallizing reaction, and such control should be done all the time, which causes a drawback of complicating the process. Therefore, there is demanded a development of a method capable of effectively removing phosphorus component with economical superiority, easiness, and convenience, and of a dephosphorizing material usable in such a method.

DISCLOSURE OF THE INVENTION

It is an object of the present invention to provide a novel dephosphorizing material which is capable of effectively removing phosphorus component in a phosphorus-containing aqueous solution in sewerages, rivers, or the like.

It is another object of the present invention to provide a dephosphorizing method which is capable of easily removing phosphorus component in a phosphorus-containing aqueous solution in sewerages, rivers, or the like, without necessity for special controls.

According to the present invention, there is provided a dephosphorizing material characterized in that a fine pore rendering percent water absorption to be not less than 10% is formed therein by solidifying starting materials comprising iron and/or an iron-containing compound, a cementitious material, water, and a mixing agent for accelerating bleeding, while bleeding not less than 2.0% by weight of the water contained in said starting materials.

According to the present invention, there is also provided a dephosphorizing method characterized in that said dephosphorizing material of claim 1 is brought into contact with a phosphorus-containing aqueous solution.

BEST MODE FOR PRACTICING THE INVENTION

Figure 1:
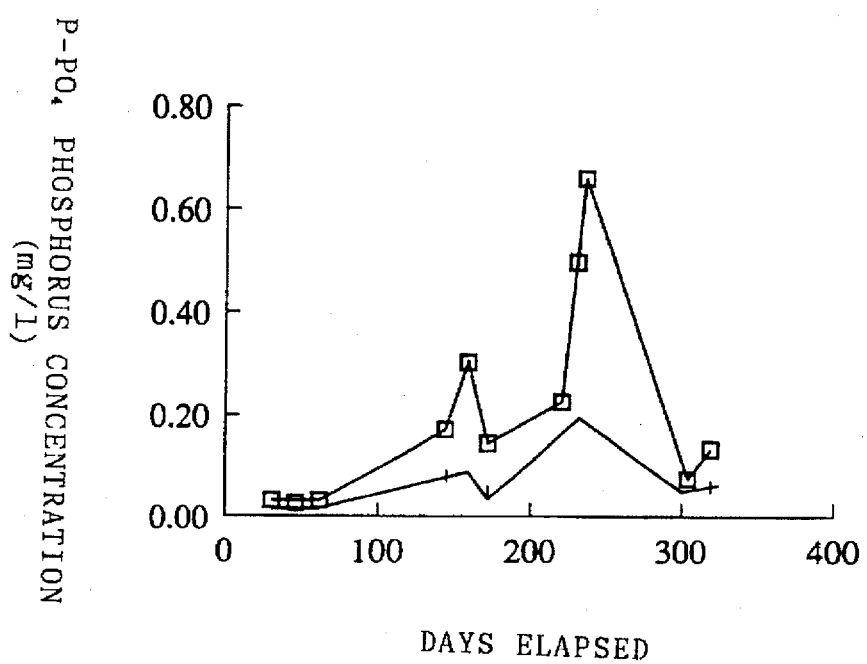
FIG. 1 is a graph showing chronologically the phosphorus concentrations in a lacustrine phosphorus-containing aqueous solution measured before and after the solution is passed through the dephosphorizing material prepared in Example 1.

Starting materials of the dephosphorizing material of the present invention include iron and/or an iron-containing compound, a cementitious material, water, and a mixing agent for accelerating bleeding as indispensable materials. The starting materials are solidified while bleeding to form therein fine pores rendering particular percent water absorption.

In solidifying the starting materials while bleeding, the water and the mixing agent for accelerating bleeding among the starting materials act to form fine pores in the dephosphorizing material to be obtained so that it exhibits particular percent water absorption. In such dephosphorizing material, when the wall surface of the fine pores thus formed, the surface of the dephosphorizing material, or the like is brought into contact with a phosphorus-containing aqueous solution, the cementitious material as well as the iron and/or the iron-containing compound contained in the dephosphorizing material react with the phosphorus-containing aqueous solution, thereby fixing the phosphorus component on the surface or the like of the dephosphorizing material in the form of $Fe(PO_4)_2 \cdot 8H_2O$ (vivianite) or $Ca_5(PO_4)_3OH$ (hydroxy apatite). In this case, the fine pores for rendering particular percent water absorption formed in the dephosphorizing material do not have to be communicating pores exhibiting water permeating function, but, on the contrary, the ratio of the fine pores exhibiting the water permeating function is small since most of the fine pores have been formed by bleeding. The pore size of the fine pores, the porosity, and the like are not particularly limited as long as the fine pores are formed by solidifying the starting materials while bleeding so as to render particular percent water absorption as mentioned above.

The percent water absorption of the above dephosphorizing material is not less than 10%, preferably 10 to 500%, most preferably 10 to 50%. If the percent water absorption is less than 10%, reaction for achieving sufficient removal of phosphorus do not occur upon bringing the dephosphorizing material into contact with the phosphorus-containing aqueous solution. Here, the percent water absorption represents the difference in weight between the dephosphorizing material immersed in water and the dephosphorizing material dried completely. With the present invention, the percent water absorption represents in percent the weight of water lost at and below 110° C. in the thermal analysis at a temperature raising ratio of 15° C./min. of the dephosphorizing material which has been prepared, aged in water at 20° C. for 28 days, and immediately pulverized.

In the dephosphorizing material of the present invention, aforementioned iron and/or the iron-containing material as a starting material may include, for example, iron powders, $Fe_2O_3$, $Fe_3O_4$, and the like. The size of the iron and/or the iron-containing material is preferably not more than 5 mm, most preferably not more than 0.1 mm in average particle size, the lower limit thereof being not particularly restricted. The proportion of the iron and/or the iron-containing material contained in the starting materials is preferably 1 to 80% by weight, most preferably 5 to 30% by weight of the total weight of the dephosphorizing material to be obtained. If the proportion of the iron and/or the iron-containing material is outside the above range, sufficient dephosphorizing effect may not be obtained, thus being not preferred.

The aforementioned cementitious material as a starting material may include, for example, normal cement, Portland cement, Portland blast furnace cement, fry ash cement, and the like. The proportion of the cementitious material contained in the starting materials is preferably 5 to 50% by weight, most preferably 10 to 30% by weight of the total weight of the dephosphorizing material to be obtained. If the proportion of the cementitious material is outside the above range, sufficient dephosphorizing effect may not be obtained, thus being not preferred.

The proportion of the water as a starting material contained in the starting materials is preferably 30 to 300 parts by weight, most preferably 60 to 100 parts by weight based on 100 parts by weight of the above cementitious material in the starting materials. If the proportion of the water is less than 30 parts by weight, it is difficult to render the desired percent water absorption to the dephosphorizing material, whereas if the proportion of the water is more than 300 parts by weight, a satisfactorily solidified body may not be obtained, thus being not preferred.

The aforementioned mixing agent as a starting material is a component which accelerates bleeding in the step of solidifying the starting materials while bleeding to be explained below, and may include, for example, naphthalenesulfonate, melamilsulfonate, ligninsulfonate, hydroxy-carboxylate, polycarboxylate, and the like. The proportion of the mixing agent contained in the starting materials is preferably 0.5 to 10 parts by weight, most preferably 1 to 5 parts by weight based on 100 parts by weight of the above cementitious material in the starting materials. If the proportion of the mixing agent is less than 0.5 parts by weight, the amount of bleeding may be little, whereas if the proportion of the mixing agent is more than 10 parts by weight, a satisfactorily solidified body may not be obtained, thus being not preferred.

To the starting materials of the present dephosphorizing material, in addition to the above indispensable starting materials, an expander or the like such as ettringite may be added for obtaining with ease a dephosphorizing material with excellent water absorption. The proportion of the expander contained in the starting materials is preferably not more than 20 parts by weight, most preferably 10 to 20 parts by weight based on 100 parts by weight of the above cementitious material in the starting materials. The expander hardly remains in the dephosphorizing material ultimately obtained, but, when employed in combination with the mixing agent in the starting materials, it is capable of easily forming fine pores in the dephosphorizing material to be obtained to increase easily the percent water absorption to the desired percent water absorption. However, if the expander is not used in combination with the above mixing agent but mixed alone in stead of the mixing agent, the desired water absorption cannot be imparted to the dephosphorizing material to be obtained.

Further, to the above starting materials, aggregates such as fine aggregates, coarse aggregates, and the like which are usually used in concrete or mortar may be added. The above aggregates may preferably be limestone (calcite), coral sand (argonite), doromite, and the like. The proportion of the aggregates contained in the starting materials is preferably not more than 90% by weight, most preferably not more than 50% by weight of the total weight of the dephosphorizing material to be obtained. If the proportion of the aggregates is more than 90% by weight, a satisfactorily solidified body may not be obtained, thus being not preferred.

The above starting materials may suitably contain a calcium salt compound such as calcium hydroxide, calcium carbonate, calcium chloride, calcium sulfate, calcium sulfate hydrate; a halide such as sodium chloride, potassium chloride, iron chloride, sodium bromide, potassium bromide; or the like as needed for such a purpose as to accelerate the reaction of fixing the phosphorus component onto the dephosphorizing material upon bringing the dephosphorizing material into contact with a phosphorus-containing aqueous solution.

The dephosphorizing material of the present invention may be prepared by solidifying the above starting materials while bleeding not less than 2.0% by weight, preferably 5.0 to 50% by weight of water contained in the starting materials. If the amount of the bled water is less than 2.0% by weight of the water contained in the starting materials, the dephosphorizing material exhibiting the predetermined water absorption cannot be obtained.

The above step of solidifying the starting materials while bleeding may be effected by centrifugal molding preferably at the maximum acceleration of 20 to 60 G, by pressure bleeding molding, by vibration tamping molding, or by the like method. In this case, the adjustment of the water absorption of the dephosphorizing material to be obtained may be effected by suitably selecting each condition for molding, as well as by suitably adjusting the amount of the above mixing agent and the expander to be mixed as needed. The obtained dephosphorizing material may be subjected to use by crushing the dephosphorizing material into suitable size, preferably into suitable size with a large specific surface area and suitable strength for the place of use. Additionally, if the dephosphorizing material is molded as a tube by centrifugal molding as in producing an ordinary Hume pipe, the obtained tube-shaped dephosphorizing material may be subjected to use as it is for passing a phosphorus-containing aqueous solution through the tube.

The dephosphorizing method of the present invention may be carried out by simply bringing the above dephosphorizing material into contact with a phosphorus-containing aqueous solution. Particularly, the present method may be carried out by immersing the dephosphorizing material in a phosphorus-containing aqueous solution such as in sewerages, rivers, sewage treatment plant aeration tanks, flow out channels, or the like; by crushing the dephosphorizing material into suitable size, charging the crushed material in a column and the like, and passing a phosphorus-containing aqueous solution through the column; by molding the dephosphorizing material itself as a tube such as a Hume pipe, and passing a phosphorus-containing aqueous solution through the tube; or by the like method.

As mentioned above, when a phosphorus-containing aqueous solution is brought into contact with the dephosphorizing material, phosphorus component is fixed on the surface and the like of the dephosphorizing material. The fixed phosphorus component may be manually or automatically scratched off of the dephosphorizing material and removed with sludge and the like. The dephosphorizing material thus freed of the reactant may again be subjected to the above dephosphorizing method as it is if the percent water absorption thereof is not less than 10%. That is, in the present method, phosphorus component can be fixed on the surface or the like of the dephosphorizing material by bringing the dephosphorizing material into contact with a phosphorus-containing aqueous solution, and the dephosphorizing material can be reused after removing the fixed phosphorus component. The interval of the removal of the phosphorus component from the dephosphorizing material may suitably be selected depending on the phosphorus concentration in water, the specific surface area of the dephosphorizing material, and the like.

Since the dephosphorizing material of the present invention has fine pores to render particular percent water absorption and is prepared from particular starting materials, it can effectively be used in dephosphorizing a phosphorus-containing aqueous solution in sewerages, rivers, or the like.

Since the present dephosphorizing method can be carried out simply by bringing the above dephosphorizing material into contact with a phosphorus-containing aqueous solution, it is extremely easy and convenient, and phosphorus component can be removed effectively from a phosphorus-containing aqueous solution without requiring special controls.

EXAMPLE

The present invention will now be explained in more detail with reference to the examples, but the present invention is not limited thereto.

EXAMPLE 1

350 kg of normal cement, 17.5 kg of iron powders, 8.4 kg of "Mighty 150 (tradename)" (manufactured by Kao Corporation, naphtalenesulphonate) as the mixing agent, 140 kg of water, and 52.5 kg of "Denka CSA (tradename)" ($3CaO.Al_2O_3.CaSO_4.nH_2O(n=12 \sim 24)$) (manufactured by Denki Kagaku Kogyo Kabushiki Kaisha, etrringite) as the expander were introduced into a centrifugal molding apparatus and centrifugal molded at a maximum acceleration of 35 G. The water bled out amounted to 23.5 kg. The resultant molded product was cured at 65° C. for 4 hours to obtain a cured molded product of 570 mm$\phi$ outer diameter, 27 mm thick, and 2430 mm long. The obtained cured molded product was cut crosswise into 25 to 30 mm long and then crushed into pieces of about 1 to 3 cm in size, thereby obtaining dephosphorizing materials. The percent water absorption of the obtained dephosphorizing material was measured by ageing the obtained dephosphorizing material in water at 20° C. for 28 days, immediately pulverizing the aged material, and thermally analyzing the pulverized material at a temperature raising rate of 15° C./min. to measure the weight of water lost at and below 110° C. As a result, the percent water absorption was found to be 15.4%.

The obtained dephosphorizing material was charged in a column of 82 mm inner diameter and 32 m long. Then lacustrine water was passed through the column at the Sv value of 2.0, and the phosphorus concentrations ($PO_4$–P) at the inlet of the column (raw water) and at the outlet of the column (liquid treated with the dephosphorizing material) were measured chronologically by the molybdenum blue method (JIS K 0102). The results are shown in FIG. 1.

EXAMPLE 2

A molded product was obtained by centrifugal molding in the same way as in Example 1 except that the mixing amount of the iron powders was 10.5 kg. The water bled out amounted to 24.6 kg. The resultant molded product was cured in the same way as in Example 1, and subsequently crushed into pieces of 2 to 4 cm in size by a breaker, thereby obtaining a dephosphorizing material. The percent water absorption of the obtained dephosphorizing material was found to be 13.5%.

Figure 2:
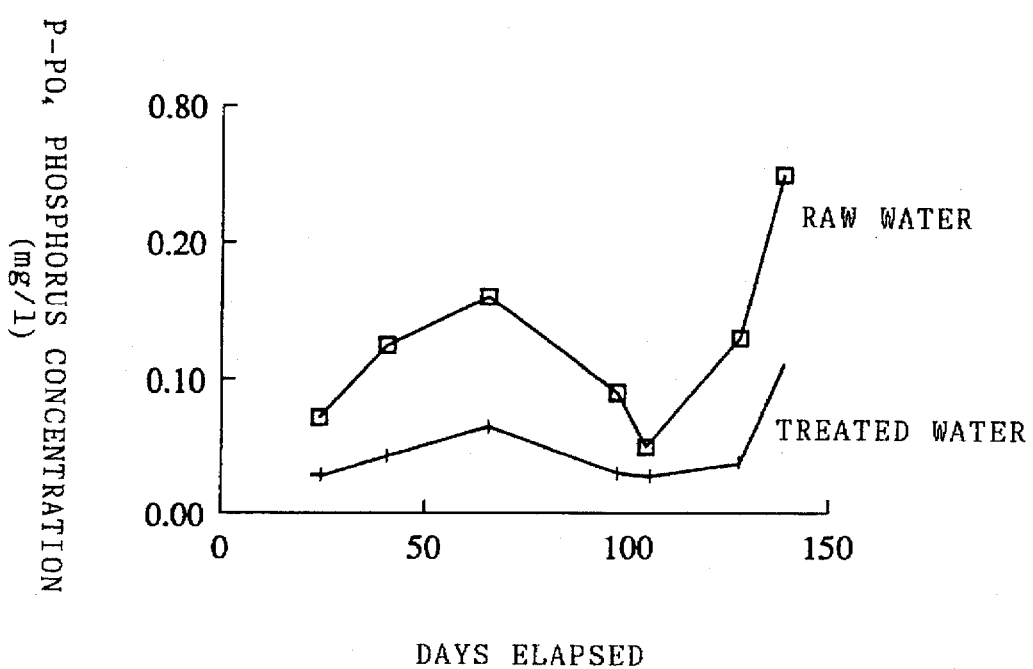
FIG. 2 is a graph showing chronologically the phosphorus concentrations in a sewage measured before and after the sewage is brought into contact with the dephosphorizing material prepared in Example 2.

The dephosphorizing material was charged in a water channel of 0.15×0.15×45 m. Then sewage was passed through the channel at the Sv value of 0.6, and the phosphorus concentrations at the inlet of the channel (raw water) and at the outlet of the channel (liquid treated with the dephosphorizing material) were measured in the same way as in Example 1. The results are shown in FIG. 2.

EXAMPLE 3

350 kg of normal cement, 35 kg of iron powders, 8.4 kg of sodium naphtalenesulphonate, 140 kg of water, and 52.5 kg of ettringite were introduced into a vibration molding apparatus and vibration molded. The water bled out amounted to 22.1 kg. Then the resultant molded product was cured at 65° C. for 4 hours, and the cured product was pulverized into powders of about 1 to 3 mm in size by a jaw crusher, thereby obtaining dephosphorizing materials. The percent water absorption of the obtained dephosphorizing material was found to be 17.1%.

Figure 3:
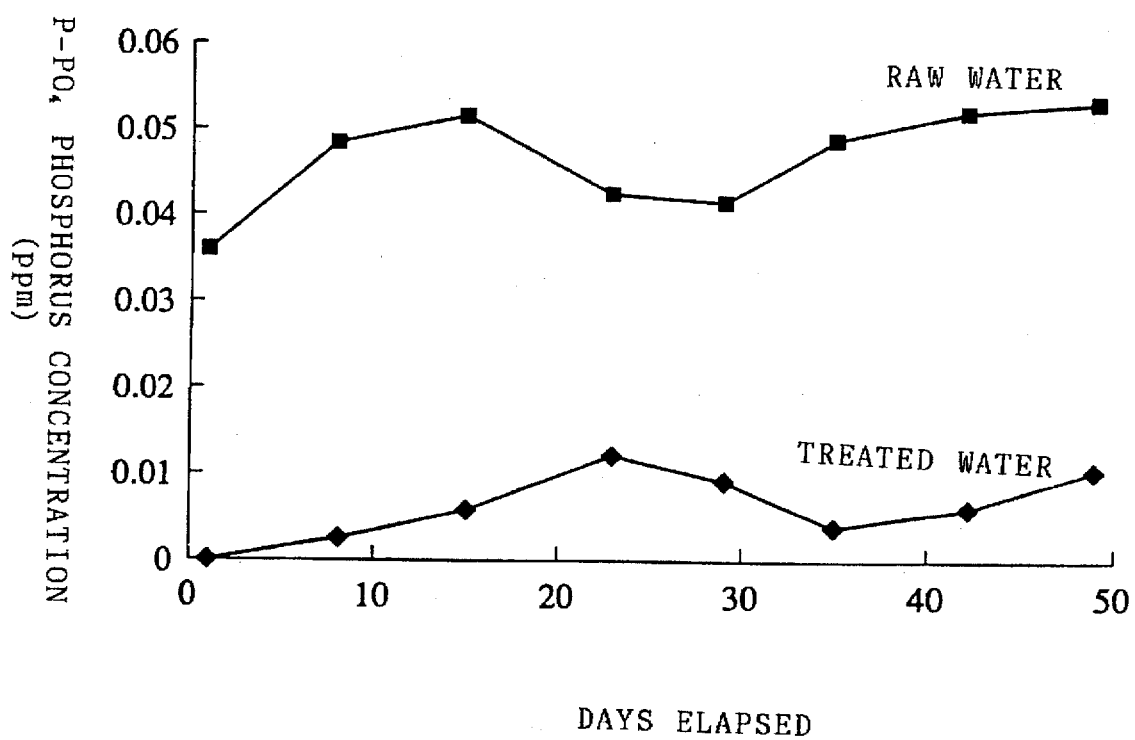
FIG. 3 is a graph showing chronologically the phosphorus concentrations in a lacustrine phosphorus-containing aqueous solution measured before and after the solution is passed through the dephosphorizing material prepared in Example 3.

The dephosphorizing material was charged in a column, and the phosphorus concentrations were measured as in Example 1. The results are shown in FIG. 3.

We claim:

1. A dephosphorizing material wherein a fine pore rendering percent water absorption of not less than 10% is formed therein by solidifying starting materials comprising iron or an iron-containing compound, a cementitious material, water, and a mixing agent for accelerating bleeding, while bleeding not less than 2.0% by weight of the water contained in said starting materials.

2. The dephosphorizing material as claimed in claim 1 wherein a proportion of said iron or said iron-containing compound contained in the starting materials is 1 to 80% by weight of the total weight of the dephosphorizing material to be obtained, and a proportion of said cementitious material contained in the starting materials is 5 to 50% by weight of the total weight of the dephosphorizing material to be obtained.

3. The dephosphorizing material as claimed in claim 1 wherein a proportion of said water contained in the starting materials is 30 to 300 parts by weight based on 100 parts by weight of the cementitious material contained in the starting materials, and a proportion of said mixing agent contained in the starting materials is 0.5 to 10 parts by weight based on 100 parts by weight of the cementitious material contained in the starting materials.

4. The dephosphorizing material as claimed in claim 1 wherein said starting materials further contain an expander.

5. The dephosphorizing material as claimed in claim 1 wherein said starting materials further contain an additive selected from the group consisting of an aggregate, a calcium salt compound, a halide, and mixtures thereof.

6. The dephosphorizing material as claimed in claim 1 wherein said solidifying the starting materials while bleeding is effected by a method selected from the group consisting of centrifugal molding at a maximum acceleration of 20 to 60 G, pressure bleeding molding, and vibration tamping molding.

7. A dephosphorizing method wherein said dephosphorizing material of claim 1 is brought into contact with a phosphorus-containing aqueous solution.

8. The dephosphorizing method as claimed in claim 7 wherein said contact is effected by immersing said dephosphorizing material in the phosphorus-containing aqueous solution.

9. The dephosphorizing method as claimed in claim 7 wherein said contact is effected by crushing said dephosphorizing material to charge the crushed material in a column, and passing the phosphorus-containing aqueous solution through said column.

10. The dephosphorizing method as claimed in claim 7 wherein said contact is effected by molding said dephosphorizing material as a tube, and passing the phosphorus-containing aqueous solution through said tube.

* * * * *

UNITED STATES PATENT AND TRADEMARK OFFICE
CERTIFICATE OF CORRECTION

PATENT NO. : 5,665,241
DATED : September 9, 1997
INVENTOR(S) : Terunobu Maeda, et. al.

It is certified that error appears in the above-identified patent and that said Letters Patent is hereby corrected as shown below:

Title page, item [75], inventors, change "Tsukuba" to Ibaraki--.

item [30], Foreign Application Priority Data, change "6-048993" to -- 6-48993--.

Signed and Sealed this

Thirteenth Day of January, 1998

Attest:

BRUCE LEHMAN

*Attesting Officer*  *Commissioner of Patents and Trademarks*